(12) United States Patent
Karandikar et al.

(10) Patent No.: US 7,543,146 B1
(45) Date of Patent: Jun. 2, 2009

(54) USING DIGITAL CERTIFICATES TO REQUEST CLIENT CONSENT PRIOR TO DECRYPTING SSL COMMUNICATIONS

(75) Inventors: Shrikrishna Karandikar, Fremont, CA (US); Thomas J. Kelly, Fergus (CA)

(73) Assignee: Blue Coat Systems, Inc., Sunnyvale, CA (US)

( * ) Notice: Subject to any disclaimer, the term of this patent is extended or adjusted under 35 U.S.C. 154(b) by 789 days.

(21) Appl. No.: 10/871,650

(22) Filed: Jun. 18, 2004

(51) Int. Cl.
*G06F 21/00* (2006.01)

(52) U.S. Cl. ...................................... 713/175
(58) Field of Classification Search .................. 713/151
See application file for complete search history.

(56) References Cited

U.S. PATENT DOCUMENTS

| 6,081,900 | A | 6/2000 | Subramaniam et al. |
| 7,266,684 | B2* | 9/2007 | Jancula ........................ 713/156 |
| 2002/0112048 | A1* | 8/2002 | Gruyer et al. ................ 709/224 |
| 2002/0194601 | A1* | 12/2002 | Perkes et al. .................. 725/44 |
| 2003/0130867 | A1* | 7/2003 | Coelho et al. ................... 705/2 |

\* cited by examiner

*Primary Examiner*—Andrew L Nalven
(74) *Attorney, Agent, or Firm*—Sonnenschein Nath & Rosenthal LLP

(57) ABSTRACT

In response to an indication of a desire to initiate a secure communication session (e.g., a session utilizing a the SSL communication protocol) with a computer resource, a digital certificate indicative of whether or not a user consents to monitoring of the secure communication session is requested. The response to this request will permit or deny such monitoring, allowing the session to proceed or be cancelled, accordingly.

18 Claims, 2 Drawing Sheets

Warning Page
10

Pop-Up Window
30

USING DIGITAL CERTIFICATES TO REQUEST CLIENT CONSENT PRIOR TO DECRYPTING SSL COMMUNICATIONS

FIELD OF THE INVENTION

The present invention relates to methods and systems for employing digital certificates as a means of ensuring that an end-user's consent is obtained for monitoring SSL transactions at a proxy.

BACKGROUND

On Jul. 5, 1993, The New Yorker magazine published a cartoon by Peter Steiner in which two dogs are seen browsing the World Wide Web. The caption of the cartoon read, "On the Internet, nobody knows you're a dog." This bit of satire brought into sharp relief the fact that although the Internet's popularity as a communication and information medium was due in large part to the ability of users to remain anonymous, it was that same anonymity that made e-commerce and other dealings risky.

In the physical world, many mechanisms are available to determine whether or not people are who they claim to be. Such checks did not, however, exist in the early days of the Internet. Since 1993, however, the use of digital signatures and their associated digital certificates have come to be common place; adding a measure of security to Internet-based transactions.

At its heart, a digital signature is a means for ensuring authenticity of an electronic document (e.g., an e-mail, spreadsheet, text file, etc.). Authenticity in this context means that a user knows who created the document and that it has not been altered in any way since that person created it. To ensure authenticity, digital signatures rely on certain forms of encryption, most commonly asymmetric encryption using digital certificates.

Asymmetric encryption is based on the use of two encryption keys—the values used by computer systems to enable special algorithms to turn clear text messages into unreadable, encrypted text and vice-versa. One of these keys, a private key, is known only to the user (or, more importantly, that user's computer). The user gives the second key—a public key—to anyone that wants it. Now, when anyone wants to send the user a message and ensure that only that user will be able to read it, the message is encrypted with the user's public key. Once encrypted, it can only be decrypted using the corresponding private key. Hence, so long as the user keeps his or her private key secret, the confidentiality of the message is assured. Note that the reverse of this process is also true—i.e., anything encrypted with the user's private key can only be decrypted with the corresponding public key.

Digital certificates exploit this scheme on scales needed by Web-based businesses. A digital certificate is essentially a certification (issued by a trusted third party known as a certificate authority or CA) that a particular public key is associated with an identity specified in the certificate (e.g., a web address of a server or other computer resource). That is, the CA validates the association between the owning entity and the public key.

In practice, when a user's Web browser (referred to generally as a client) first tries to contact a server for a secure transaction, the server sends its digital certificate to the client. This certificate includes (among other things) the server's public key, the server's identity, the name of the CA that signed the certificate and the signature itself (which is a mathematical hash of the certificate encrypted with the CA's private key). To validate the certificate, the client computes the certificate hash and compares the result with the hash obtained by decrypting the signature using the CA's public key (as well as checking the validity dates and identity included in the certificate against the desired server). To then validate the server, the client encrypts a message with the public key obtained from the certificate and sends it to the server. If the server can prove it can decrypt that message then it must have the associated private key and the authentication has succeeded. If desired, the server may likewise validate the client. Once the client and (optionally) the server is/are satisfied that each is the computer it claims to be, the client and server can exchange session keys (additional keys that are used to encrypt the data transfers between the computers from then on). Thus, authentication and encryption, two major security functions, are achieved using one technology. One sign that this technology has become widely adopted is the fact that many existing Web browsers and other software applications arrive preconfigured with public keys for the major commercial CAs.

The authentication process described above is embodied in the well-known secure socket layer (SSL) protocol. Originally developed by Netscape Communications, SSL has been universally accepted on the World Wide Web for authenticated and encrypted communication between clients and servers. One of the goals of SSL is to prevent so-called, "man-in-the-middle" attacks.

The "man in the middle" can be regarded as a rogue computer that attempts to insert itself in communications between a client and a server. Where secure communications are employed, the rogue attempts to intercept the legitimate keys that are passed back and forth during the SSL exchange, substitute its own keys, and make it appear to the client that it is the server, and to the server that it is the client. This is accomplished by the rogue exchanging its own keys with the client and server, allowing the rogue to establish its own session keys for use with the real server and client. Thus, the rogue not only is able to read all the data that flows between the client and the real server, but also to change the data without being detected. To counter this threat, an important part of the SSL authentication process requires that a client check that the domain name in the server's certificate corresponds to the actual domain name of the server with which the client is attempting to communicate (this is in addition to checking the validity of the certificate by performing other steps in the authentication process).

Thus, the SSL protocol has built in safeguards to prevent third party computers from snooping on communications between a client and a server. Sometimes, however, such snooping is not malicious. For example, Internet devices known as proxies are often used as "men-in-the-middle" to act as caches, content filters, virus filters, etc. Where SSL is used, however, such proxies are unable to participate in the communication stream (because the SSL protocol itself is designed to ensure they cannot). This presents a problem where there are legitimate reasons for a proxy to intercept SSL communications and it is therefore desirable to have a scheme for overcoming such difficulties.

SUMMARY OF THE INVENTION

In one embodiment, the present invention provides for requesting, in response to an indication of a desire to initiate a secure communication session (e.g., a session utilizing the SSL communication protocol) with a computer resource, a digital certificate indicative of whether or not a user consents to monitoring of the secure communication session. In this context, monitoring of the secure communication session may include decrypting encrypted packets at a computer system other than that which is an ultimate destination for information included in said packets. Preferably, though not necessarily, the digital certificate includes a common name sufficiently descriptive to permit the user to understand the consequences of authorizing transmission of said digital certificate. The user may be presented with an option to transmit either of a pair of digital certificates in response to the request, wherein one the pair of digital certificates is associated with authorization by the user to permit such monitoring and the other digital certificate is associated with denial of such consent.

Further embodiments of the present invention include a computer system having means for receiving an indication of a desire to initiate a secure communication (e.g., SSL) session between two computer systems; and means for requesting a digital certificate indicative of whether or not a user consents to monitoring of said secure communication session. As above, this monitoring may include decrypting encrypted packets at the computer system, which may be a computer other than either of the two computer systems between which the overall communication session is to occur.

BRIEF DESCRIPTION OF THE DRAWINGS

The present invention is illustrated by way of example, and not limitation, in the figures of the accompanying drawings in which.

DETAILED DESCRIPTION

Figure 1:
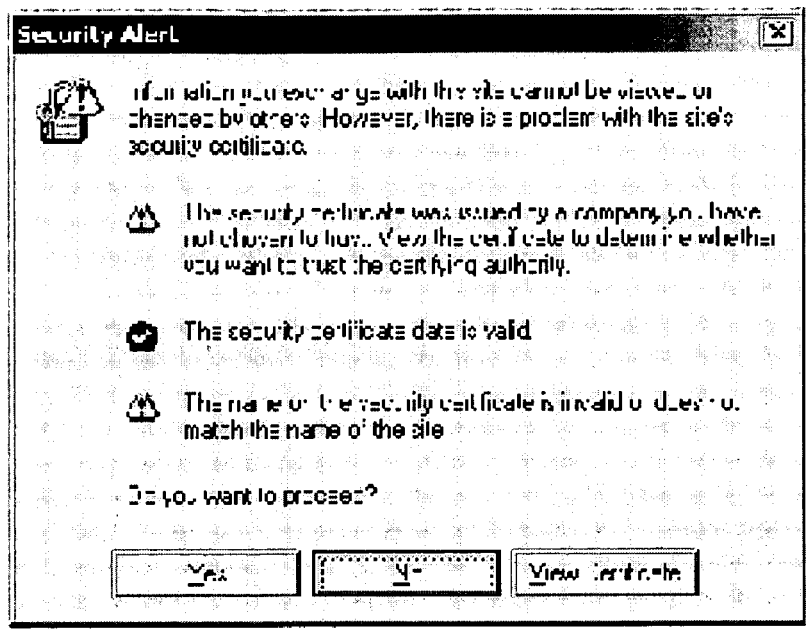
FIG. 1 illustrates an example of a warning page used in prior schemes to alert users when unexpected errors are encountered with digital certificates exchanged between computers.

Described herein are methods and systems for employing digital certificates as a means of ensuring that an end-user's consent is obtained for monitoring SSL transactions at a proxy. Such monitoring may be needed for legitimate purposes, such as content filtering, virus scanning, URL filtering, and so on. Obtaining the user's consent before commencing such monitoring is important so that privacy regulations and user expectations are met. As used herein, the term SSL is meant to imply or represent all versions of the SSL protocol, including but not limited to SSL version 2.0, SSL version 3.0 and SSL version 3.1 (commonly known as the TLS protocol) and also any future versions of the protocol as well. Moreover, the present methods and systems may be used in conjunction with any secure communications protocol that supports client authentication using certificates.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, signals, data, elements, symbols, characters, terms, numbers, or the like.

Before describing the present invention in detail, it is helpful to discuss some of the limitations of other proposed solutions for monitoring SSL communications at a proxy. In one such solution, an enterprise administrator defines a company-wide policy regarding which digital certificates are to be accepted or not. In such a scheme, the administrator essentially takes the decision about whether or not to accept a proxy's certificate out of the user's hands, for example by importing the CA used by a proxy into the user's browser, making it a trusted CA for that browser. Thus, users are not given the option of refusing an SSL connection via the proxy (because the proxy's certificate is now signed by a trusted CA) and although security may be maintained through to the server, user consent is ignored.

A second scheme involves the use of HTML splash pages. Splash page is a generic term given to opening pages for web sites that often must be clicked through in order to arrive at a page containing true content. In the context of proxies taking part in SSL communications the term has a slightly different meaning. Here, the splash page (which may be in the form of a popup or HTML frame) would be generated by the proxy after recognizing that the client is attempting to use SSL communications and would ask the client to provide his/her consent to the proxy after decrypting and reading the SSL traffic. This means that the proxy will have already decrypted the user's initial communication (without the user's consent) in order to respond to the user with a splash page. This sort of act-first-and-ask-later approach may be unacceptable to many users.

Further, the technique is not always reliable. When the client has requested an image, for example, an HTML splash page cannot be sent by the proxy. As there is no way to know in advance what sort of objects a client will request, the splash page approach breaks down. Additionally, if pop-ups are used the user's browser might be using a pop-up blocker which will prevent the splash page from being displayed.

A third approach is to rely on the existing warning messages which many browsers generate in response to unexpected events during SSL communications. As shown in FIG. 1, a client browser may generate a warning page 10 when it receives an indication that a computer other than the server the browser was attempting to contact has replied. In fact, warning page 10 provides two such warnings: One is a warning to the user that the digital certificate received by the browser was issued by an entity that the browser does not recognize (or that the browser has not been configured to trust). The second is a warning that the certificate does not comply with the name of the server the browser was attempting to contact. For the sophisticated user this latter warning may be an indication of a man-in-the-middle attack or, at the very least, that somewhere in the communication path with the server another computer is participating.

There are several problems with the warning page approach, not the least of which is the fact that many users will simply not understand what is being communicated to them. The typical warning messages included within the warning pages are often meaningless to all but the most sophisticated users. As a result, users often click on the "OK" or "YES" button (in a hope that the transaction will proceed)

without realizing the consequences of their action. While it is possible to include further information in the certificate sent by the proxy (viewable if the user selects the "View Certificate" button on the warning page), most users would have little or no idea such information was available, let alone comprehend its meaning.

To avoid the shortcomings of the above-described schemes, the present invention provides a clear and unambiguous mechanism for notifying the user and seeking his/her consent prior to allowing a proxy to monitor SSL communications (i.e., decrypt the SSL messages for review at the proxy before re-encrypting them for transmission to the server). The present methods may also ensure that this consent was given by the user involved, since the present methods allow for authenticating the user as well as obtaining that user's consent (e.g., in the case where a different certificate pair exists for each user). In doing so, the present invention makes use of the existing SSL handshake protocol to force a user to affirmatively accept or reject the monitoring by the proxy. If the monitoring is accepted, SSL communications proceed (from the user's point of view) as usual. If the user rejects the monitoring (or attempts to make a non-election), no communications are permitted.

More specifically, in order to ensure that a user is properly notified and that his/her consent is sought and obtained prior to monitoring SSL traffic at a proxy, the proxy is configured to seek a digital certificate from the user that specifies whether or not the user consents to such action. Recall that an optional part of a conventional SSL handshake is authentication of the client by the server. Here, the proxy plays the part of the server and asks for a digital certificate as if seeking authentication. Rather than authentication, however, what the proxy is really seeking is a certificate associated with a "Yes" or "No" answer to the question of whether the user will permit monitoring of the SSL traffic at the proxy. If the user responds to the request by transmitting the "Yes" certificate, communications are allowed to proceed and the SSL traffic is decrypted, examined and re-encrypted at the proxy before being transmitted to the server. If the user sends the "No" certificate in response to the request, further SSL communications are prohibited.

Figure 2:
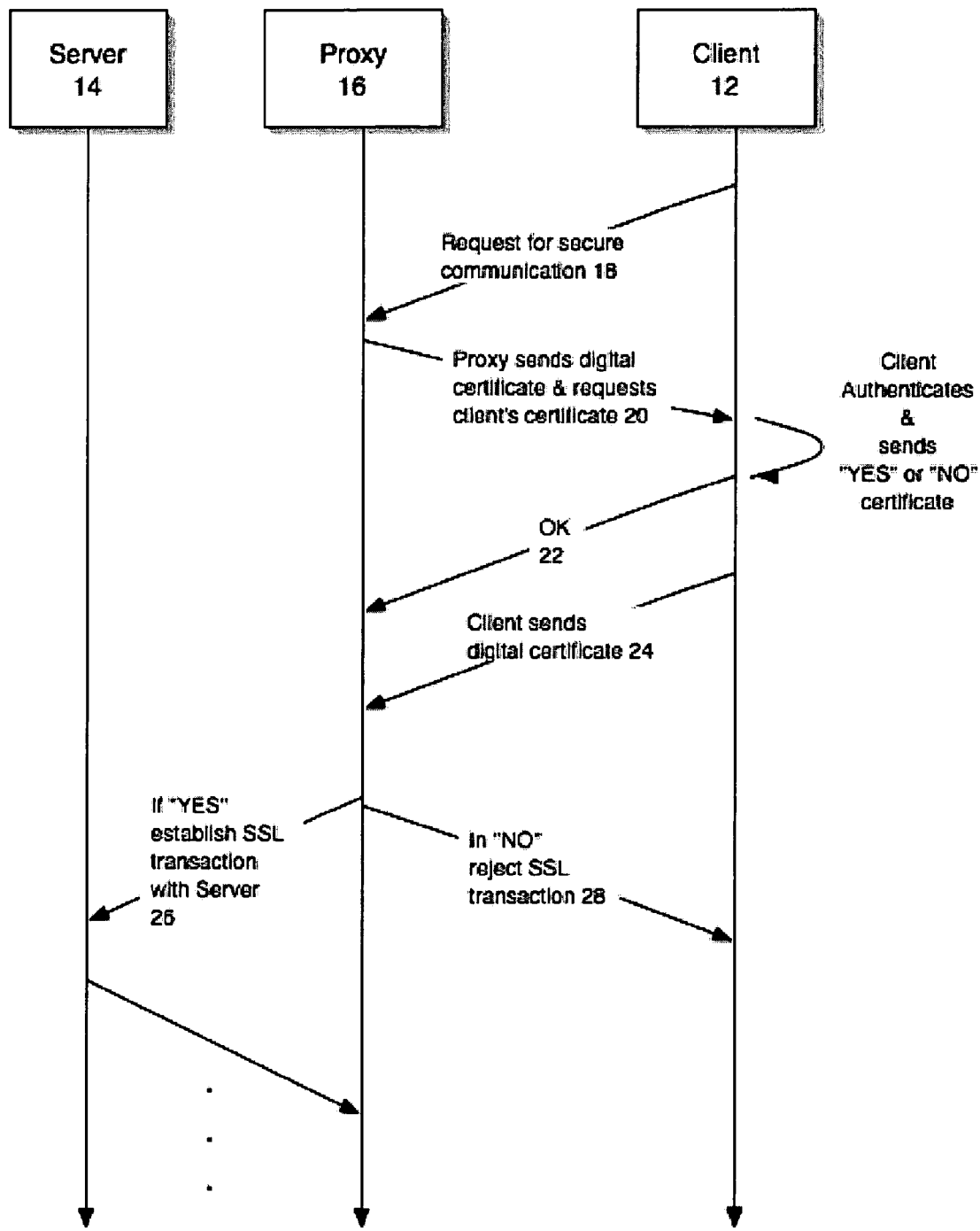
FIG. 2 illustrates an example of a handshake between a client (e.g., a Web browser) and a proxy configured to request user consent prior to monitoring SSL communications in accordance with an embodiment of the present invention.

To better understand this process, refer to FIG. 2. In this example, a client (e.g., a web browser) 12 is attempting to establish an SSL session with a server 14. A proxy 16 has been deployed in the communication path between the client and the server, for example to provide virus scanning. Initially, when the client 12 sends a request (18) for the secure session, rather than passing this request to the server 14 the proxy 16 sends back its own digital certificate and requests that the client do likewise. This is similar to the exchange that would occur between any two nodes in an SSL handshake, with the exception that the proxy's request for a certificate specifies the CA from which it will accept such a certificate. In this case, the CA is one that provided the client with "accept" and "reject" certificates for use in these forms of proxy-mediated SSL transactions. If user-specific "accept" and "reject" certificates are used, the certificates will also permit authenticating the actual user (or at least the client browser).

Figure 3:
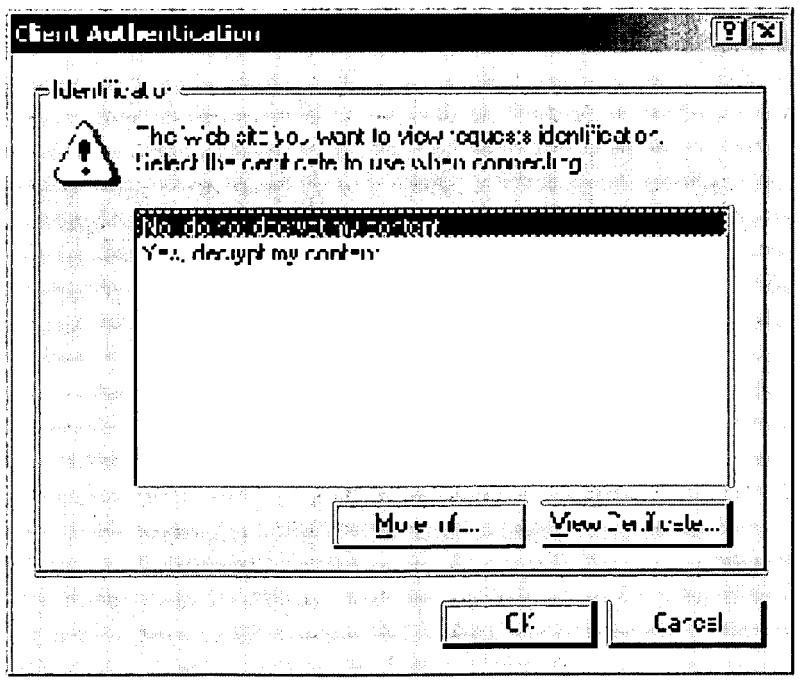
FIG. 3 illustrates an example of a pop-up window to be displayed to a user in response to a request by a proxy for authorization to monitor SSL communications in accordance with an embodiment of the present invention.

In response to the materials sent by the proxy 16, client 12 authenticates the proxy (impersonating the desired server) and then presents the user with an option to select either the "accept" or "reject" certificate for return to the proxy 16. As shown in FIG. 3, the choice may be presented by way of a pop-up window 30, which informs the user that the proxy is seeking to intervene in the secure communication with the server. Arranged within the window are options to select one of the certificates. Any form of message may be associated with the certificate choices (the text thereof may correspond to the certificates' "common names"), so long as it conveys the notion that selecting one of the certificates will allow the user's encrypted content to be decrypted, while selecting the other one will not.

Returning again to FIG. 2, if the user selects the "accept" or "YES" certificate, it is sent (24) to the proxy 16, which may then establish appropriate session keys with the client 12 according to conventional SSL communication protocol practices. Thereafter, the proxy 16 establishes (26) a second SSL communications session with the server 14. This allows secure communications between the client 12 and the server 14, and further permits the proxy 16 to decrypt the communications to/from the client 12 for virus scanning (or other purposes). Importantly, the user will have explicitly consented to this activity by transmitting the appropriate digital certificate in response to the proxy's request.

If, on the other hand, the user selects the "NO" or "reject" certificate in response to the proxy's request, then the request for an SSL session is rejected (28). For example, when proxy 16 receives the "NO" certificate, it can force an SSL handshake failure by failing the verification of that certificate. This way no SSL session key is exchanged and the user's browser transmits no private data, ensuring that the user's privacy is preserved. An alternative implementation could allow for completing the SSL handshake and then closing the connection on receiving a "NO" certificate. Note that in this case a session key will be exchanged even though the proxy will not decrypt the content.

As indicated above, the user is given an option to accept or reject the monitoring of the SSL communications by the proxy. This is accomplished, in one embodiment of the present invention, by providing the client computer system with a pair of digital certificates for use by a client application (e.g., a Web browser) when communicating with the proxy. The digital certificates are likely issued by a private CA (e.g., the network administrator for the enterprise network that will include the proxy), but in other embodiments they may be issued by a public CA. Regardless of the issuing authority, the digital certificates will correspond to conventional certificates in all material respects, with the exception that the certificates will be tagged in such a way that their meaning is apparent to the user.

For example, the certificates may employ "common names" that are meaningful to an average user. Names such as "I consent" or "YES" or "Accept" may be used for the certificate to be associated with an indication that the user will permit monitoring at the proxy. Likewise, names such as "NO" or "I do not consent" or "Reject" may be used for the certificate associated with an indication that the user will not permit such monitoring.

Now, when the proxy asks for the user's digital certificate as part of the SSL handshake, the proxy will further indicate that the only acceptable certificate is one issued by the CA that issued the "Accept"/"Reject" pair of certificates to the user. Facilities for specifying an allowable CA are already included within the SSL protocol. In response, the pop-up window 30 will be displayed in the user's browser, forcing the user to make a choice between accepting or rejecting the monitoring.

Facilities for causing the pop-up window 30 to appear in the user's browser already exist in commercially available Web browsers (e.g., Microsoft's Internet Explorer™ and Netscape's Communicator™). In fact, one reason for issuing a certificate pair and not simply an "Accept" or "Reject" certificate is to ensure that the browser reacts by presenting the user with a choice. That is, if only one certificate from the required CA were present in the user's certificate cache, some browsers may automatically present that certificate to the proxy in response to the request without giving the user an opportunity to provide or withhold his/her consent.

The pop-up window 30 may be configured with a detailed textual description of what is being asked and the consequences of the user making a selection between the certificate choices. In other embodiments, such information may only be viewable if a user selects a "HELP" button or function. It is preferably the case that the common names chosen for the certificates (which names will appear in pop-up window 30) are such that the names themselves will convey sufficient information to the user to understand the consequences of selecting one or the other for return to the proxy.

Thus, methods and systems for employing digital certificates as a means of ensuring that an end-user's consent is obtained for monitoring SSL transactions at a proxy have been described. It is important to remember, however, that the present invention should not be limited by the examples discussed above and illustrated in the drawings. These materials were provided solely for purposes of explanation, in order to provide a thorough understanding of the present invention. Those of ordinary skill in the art will understand that the present invention may be practiced without these specific details. In some instances, well-known structures and devices were shown in block diagram form, rather than in detail, in order to avoid obscuring the present invention.

Where terms such as "processing" or "computing" or "calculating" or "determining" or "displaying" or the like were used, these terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. This was done in an effort to communicate the fact that the present invention may be implemented in a general-purpose computer, selectively activated or reconfigured by a computer program stored therein to perform the above-described operations.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software.

One of skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, etc.), as taking an action or causing a result. Such expressions are merely a shorthand way of saying that execution of the software by a computer causes the processor of the computer to perform an action or produce a result. Thus, the present invention should only be measured in terms of the claims, which follow.

What is claimed is:

1. A method, comprising:
   at a proxy disposed within a communication path between a client and a server and in response to a request from the client to establish a secure communication session with the server, requesting, by the proxy, a digital certificate indicative of whether or not a user associated with the client consents to monitoring of said secure communication session, said digital certificate being one of a pair of digital certificates, a first of which is indicative of the user's consent to said monitoring and a second of which is indicative of said user's lack of consent to said monitoring.

2. The method of claim 1, wherein said secure communication session comprises a session utilizing a secure communications protocol that supports client authentication using certificates.

3. The method of claim 1, wherein the digital certificate is unique to the user.

4. The method of claim 1, wherein said secure communication session comprises a session utilizing a secure socket layer (SSL) communication protocol.

5. The method of claim 4, wherein monitoring of said secure communication session comprises decrypting encrypted packets at a computer system other than that which is an ultimate destination for information included in said packets.

6. The method of claim 4, wherein said digital certificate comprises a common name sufficiently descriptive to permit the user to understand consequences of authorizing transmission of said digital certificate.

7. The method of claim 1, further comprising presenting the user with an option to transmit either of the pair of digital certificates in response to the request.

8. A computer system, comprising:
   means for receiving an indication of a desire to initiate a secure communication session between a first computer system and a second computer system; and
   means for requesting a digital certificate indicative of whether or not a user of the first computer system consents to monitoring of said secure communication session, said digital certificate being one of a pair of digital certificates, a first of which is indicative of the user's consent to said monitoring and a second of which is indicative of said user's lack of consent to said monitoring.

9. The computer system of claim 8 wherein said secure communication session comprises a session utilizing a secure communications protocol that supports client authentication using certificates.

10. The computer system of claim 8 wherein said secure communication session comprises a session utilizing a secure socket layer (SSL) communication protocol.

11. The computer system of claim 8, wherein monitoring of said secure communication session comprises decrypting encrypted packets at the second computer system.

12. The computer system of claim 8, wherein monitoring of said secure communication session comprises decrypting encrypted packets at a third computer system other than either of the first and second computer systems.

13. The computer system of claim 8, wherein said digital certificate comprises a common name sufficiently descriptive to permit the user to understand consequences of authorizing transmission of said digital certificate.

14. A method, comprising receiving an indication of a desire to initiate a secure communication session between a first computer system and a second computer system, and transmitting a request for a digital certificate indicative of whether or not a user of the first computer system consents to monitoring of the secure communication session, said digital certificate being one of a pair of digital certificates, a first of which is indicative of the user's consent to said monitoring and a second of which is indicative of said user's lack of consent to said monitoring.

15. The method of claim 14, wherein the secure communication session comprises a session utilizing a secure communications protocol that supports client authentication using certificates.

16. The method of claim 14, wherein the secure communication session comprises a session utilizing a secure socket layer (SSL) communication protocol.

17. The method of claim 16, wherein monitoring of the secure communication session comprises decrypting encrypted packets at the second computer system.

18. The method of claim 17, further comprising presenting the user with an option to transmit either of the pair of digital certificates in response to the request.

* * * * *